(12) United States Patent
Kinoshita

(10) Patent No.: US 8,221,173 B2
(45) Date of Patent: Jul. 17, 2012

(54) WATER JET PROPULSION WATERCRAFT

(75) Inventor: Yoshimasa Kinoshita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 283 days.

(21) Appl. No.: 12/644,313

(22) Filed: Dec. 22, 2009

(65) Prior Publication Data

US 2010/0248563 A1 Sep. 30, 2010

(30) Foreign Application Priority Data

Mar. 31, 2009 (JP) ................. 2009-086430

(51) Int. Cl.
*B63H 21/22* (2006.01)
(52) U.S. Cl. .......................... 440/1; 440/89 R
(58) Field of Classification Search ............. 440/1, 89 R
See application file for complete search history.

(56) References Cited

U.S. PATENT DOCUMENTS

| 5,724,929 | A | 3/1998 | Mikame et al. | |
|---|---|---|---|---|
| 6,725,832 | B2 * | 4/2004 | Yokoyama et al. | 123/396 |
| 2008/0230040 | A1 * | 9/2008 | Wilson et al. | 123/568.18 |

FOREIGN PATENT DOCUMENTS

JP 11-208591 A 8/1999

OTHER PUBLICATIONS

Kinoshita; "Water Jet Propulsion Watercraft"; U.S. Appl. No. 12/644,357, filed Dec. 22, 2009.

* cited by examiner

*Primary Examiner* — Stephen Avila
(74) *Attorney, Agent, or Firm* — Keating & Bennett, LLP

(57) ABSTRACT

A water jet propulsion watercraft includes an engine, an exhaust channel, and an engine control unit. The engine includes a combustion chamber arranged to combust fuel therein, an exhaust port arranged to discharge exhaust gas after the combustion of the fuel in the combustion chamber, an exhaust valve arranged to open and close the exhaust port, an intake port arranged to pass air and the fuel into the combustion chamber, and an intake valve arranged to open and close the intake port. The exhaust channel is connected to the exhaust port of the engine and provides a channel through which the exhaust gas, discharged from the exhaust port, flows. The engine control unit is arranged to control the engine such that at least one location in a path leading from the exhaust channel to the intake port is blocked when the engine is stopped.

12 Claims, 12 Drawing Sheets

WATER JET PROPULSION WATERCRAFT

BACKGROUND OF THE INVENTION

1. Field of the Invention

The present invention relates to a water jet propulsion watercraft including a jet propulsion device driven by an engine, in particular, an internal combustion engine.

2. Description of the Related Art

A water jet propulsion watercraft according to one prior art is disclosed in Japanese Unexamined Patent Application Publication No. 11-208591 (1999). The water jet propulsion watercraft is a personal watercraft that obtains a propulsive force from a jet propulsion device driven by an internal combustion engine. The jet propulsion device is arranged to draw in water from around a hull, jet the water, and apply a reaction force obtained by the jetting to the hull.

The engine includes a combustion chamber in which fuel is combusted, an exhaust valve opening and closing an exhaust port, and an intake valve opening and closing an intake port. The exhaust gas exhausted from the combustion chamber passes through the exhaust port. Air that is made to flow into the combustion chamber passes through the intake port. An exhaust channel is connected to the exhaust port. The exhaust gas is discharged to an exterior of the hull through the exhaust channel.

In Japanese Unexamined Patent Application Publication No. 11-208591 (1999), it is described that an overlap period, in which the intake valve and the exhaust valve are opened simultaneously, is provided to increase exhaust pressure and increase engine output.

SUMMARY OF THE INVENTION

The inventor of preferred embodiments of the present invention described and claimed in the present application conducted an extensive study and research regarding a water jet propulsion watercraft, such as the one described above, and in doing so, discovered and first recognized new unique challenges and problems as described in greater detail below.

That is, when the engine stops during the overlap period, a state in which communication is made from the intake side to the exhaust side (exhaust channel) is entered. In this case, for example, when there are waves on the water surface on which the water jet propulsion watercraft floats, the exhaust channel may become clogged with water and exhaust gas remaining inside the exhaust channel may be forced by water toward the combustion chamber and the intake side. It may thus be difficult to ignite the fuel when the engine is restarted. Consequently, it may not be possible to restart the engine smoothly.

In order to overcome the previously unrecognized and unsolved problems described above, a preferred embodiment of the present invention provides a water jet propulsion watercraft that includes a hull, an engine, a jet propulsion device, an exhaust channel, and an engine control unit. The engine includes a combustion chamber arranged to combust fuel, an exhaust port arranged to discharge exhaust gas after the combustion of the fuel in the combustion chamber, an exhaust valve arranged to open and close the exhaust port, an intake port arranged for air and the fuel to flow into the combustion chamber therethrough, and an intake valve arranged to open and close the intake port. The jet propulsion device is arranged to be driven by the engine and to draw in water from around the hull and then jet the water. The exhaust channel is connected to the exhaust port of the engine. The exhaust gas, discharged from the exhaust port, flows through the exhaust channel. The engine control unit is arranged to control the engine such that at least one location in a path leading from the exhaust channel to the intake port is blocked when the engine is stopped.

As described above, with the water jet propulsion watercraft according to the present preferred embodiment, at least one location in the path leading from the exhaust channel to the intake port is blocked when the engine is stopped. Thus, even when the exhaust channel becomes clogged with water and the exhaust gas remaining inside the exhaust channel is forced toward the combustion chamber and the intake side, the exhaust gas can be suppressed from flowing to the intake side. Difficulty in igniting the fuel when restarting the engine can thus be minimized or avoided. Consequently, the engine can be restarted smoothly.

Preferably, the engine control unit is arranged to stop at at least one of either the exhaust valve or the intake valve at a position at which at least one of either the exhaust port or the intake port is closed when the engine is stopped. By this arrangement, at least one location in the path leading from the exhaust channel to the intake port can be blocked by the exhaust port or the intake port.

Preferably, the engine control unit is arranged to stop the exhaust valve at a position of closing the exhaust port when the driving of the engine is stopped. By this arrangement, the exhaust gas retained in the exhaust channel can be suppressed from flowing not only into the intake side but also into the combustion chamber. Difficulty in igniting the fuel when restarting the engine can thus be minimized even more.

A water jet propulsion watercraft according to a preferred embodiment of the present invention further includes a detection unit arranged to detect whether or not the exhaust valve closes the exhaust port and whether or not the intake valve closes the intake port. Preferably, the engine control unit is arranged to control the engine to move at least one of either the exhaust valve or the intake valve to close at least one of either the exhaust port or the intake port when the detection unit detects that both the exhaust valve and the intake valve are stopped at positions of, respectively, opening the exhaust port and the intake port when the engine is stopped. By this arrangement, at least one of either the exhaust valve or the intake valve can readily be moved to the closed position by operation of the detection unit and the engine control unit when the engine is stopped.

Preferably, the engine further includes a crankshaft arranged to be rotated during driving of the engine and to serve as a drive source that respectively moves the exhaust valve and the intake valve, and a starter motor arranged to cause the crankshaft to rotate during starting. Preferably, in this case, the engine control unit is arranged to control the starter motor until at least one of either the exhaust valve or the intake valve is moved to the position of closing the exhaust port or the intake port when the detection unit detects that both the exhaust valve and the intake valve are stopped at positions of, respectively, opening the exhaust port and the intake port when the engine is stopped. By this arrangement, at least one of either the exhaust valve or the intake valve can readily be moved to the closed position by use of the starter motor when the engine is stopped.

Preferably, in this case, the control unit is arranged to drive the starter motor again when the detection unit detects that both the exhaust valve and the intake valve are still stopped at positions of, respectively, opening the exhaust port and the intake port after the starter motor has been driven by a predetermined drive amount. By this arrangement, at least one of either the exhaust port or the intake port can be closed reliably when the engine is stopped.

In a preferred embodiment of the present invention, the engine further includes a first cam portion arranged to cause the exhaust valve and the intake valve to move respectively at predetermined timings, and the engine control unit is arranged to control a rotation timing of the first cam portion to change the rotation timing of the first cam portion between when the engine is driven and when the engine is stopped. The engine control unit thereby changes the timing of moving at least one of the exhaust valve and the intake valve so that an overlap period, in which the exhaust port and the intake port are opened simultaneously, occurs when the engine is driven while the overlap period does not occur when the engine is stopped. By this arrangement, the exhaust port and the intake port can readily be prevented from opening simultaneously by performing rotation control of the first cam portion when the engine is stopped.

In a preferred embodiment of the present invention, the engine is arranged to move the exhaust valve and the intake valve when opening and closing the exhaust port and the intake port, respectively, and the engine further includes a second cam portion arranged to be movable with respect to at least one of either the exhaust valve or the intake valve. The engine control unit is arranged to control a position of the second cam portion to change the position of the second cam portion between when the engine is driven and when the engine is stopped. The engine control unit thereby changes a displacement amount of at least one of the exhaust valve and the intake valve so that an overlap period, in which the exhaust port and the intake port are opened simultaneously, occurs when the engine is driven while the overlap period does not occur when the engine is stopped. By this arrangement, the exhaust port and the intake port can readily be prevented from opening simultaneously by changing the position of the second cam portion when the engine is stopped.

Preferably, after the engine is stopped, the engine control unit is arranged to continue the control operation until the detection unit detects that at least one of either the exhaust valve or the intake valve is stopped at a position of closing the exhaust port or the intake port. By this arrangement, the control of closing at least one of either the exhaust port or the intake port can be performed readily even after the engine is stopped.

Preferably, the water jet propulsion watercraft further includes a fuel injection apparatus that injects fuel into the intake port. Preferably, in this case, when starting of the engine is performed, the engine control unit is arranged to deliver the exhaust gas, retained at the intake side relative to the exhaust port, to the exhaust channel side in a state where a fuel injection apparatus fuel injection amount is set lower than an ordinary value (for example, set to zero) for a predetermined period and to set the injection amount of the fuel injection apparatus to the ordinary injection amount after elapse of the predetermined period. By this arrangement, even if the exhaust gas is retained at the intake side relative to the exhaust port when the engine is restarted after the engine has been stopped, the retained exhausted gas can be delivered to the exhaust channel side. Accordingly, gas concentrations of components that hinder combustion in the combustion chamber can be lowered. The fuel injected by the ordinary injection amount from the fuel injection apparatus after the elapse of the predetermined period can thus be ignited reliably. Consequently, the engine can be restarted smoothly.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A structure of a water jet propulsion watercraft 1 according to a first preferred embodiment of the present invention will now be described with reference to FIG. 1 to FIG. 5.

Figure 1:
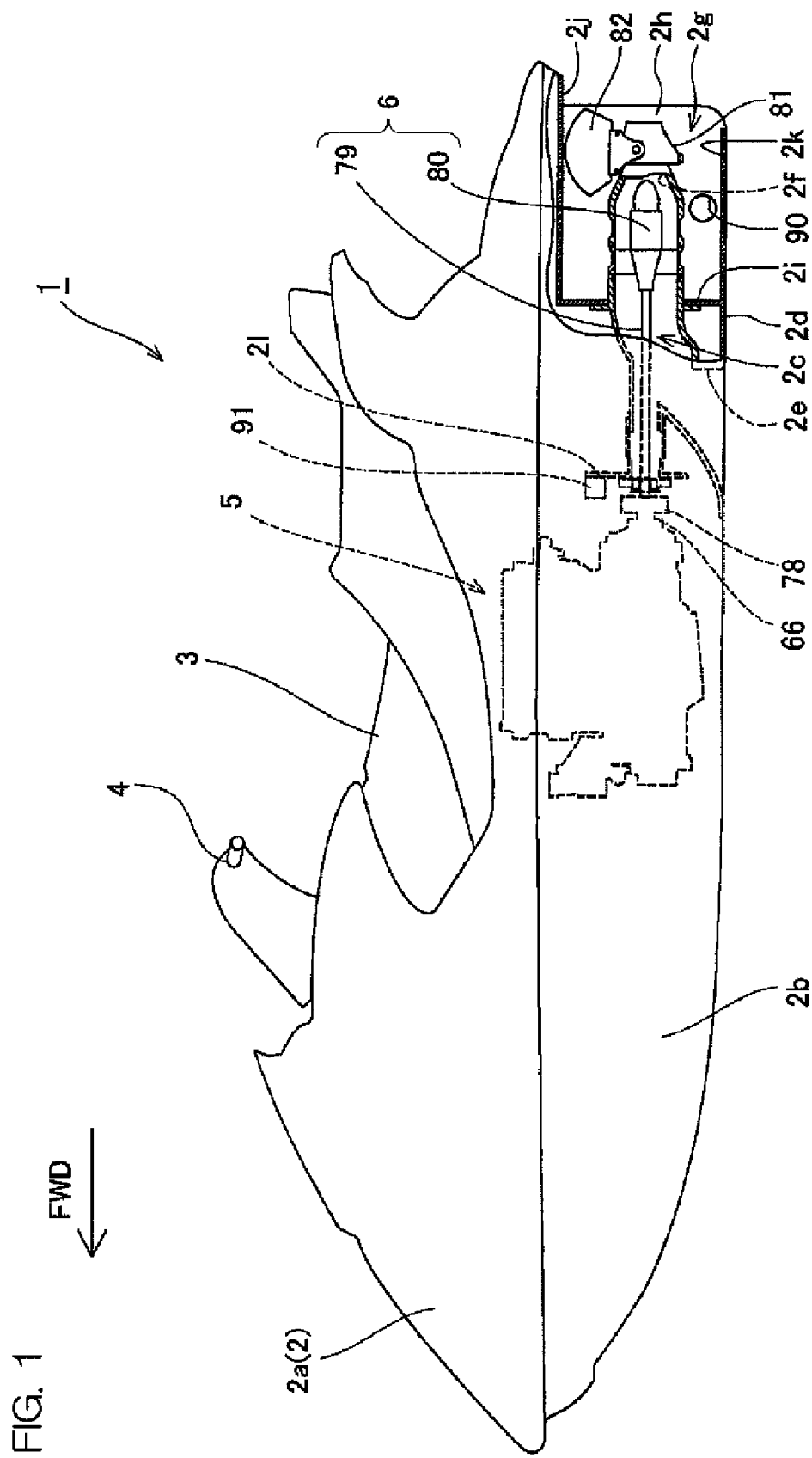
FIG. 1 is a side view of an overall arrangement of a water jet propulsion watercraft according to a first preferred embodiment of the present invention.

FIG. 1 is a side view of an overall arrangement of the water jet propulsion watercraft according to the first preferred embodiment of the present invention. The water jet propulsion watercraft 1 includes a hull 2, an engine 5, and a jet propulsion device 6. The hull 2 is made up of a deck 2a and a hull body 2b, and a seat 3 is disposed at an upper portion thereof. A steering apparatus 4 arranged to be operated by an operator for steering the hull 2 is disposed in front of the seat 3. The engine 5 is an internal combustion engine that is installed in an engine room formed in an interior of the hull 2. The jet propulsion device 6 is driven by a driving force of the engine 5 and applies a propulsive force to the hull 2 by drawing in water from around the hull and jetting the water.

Figure 2:
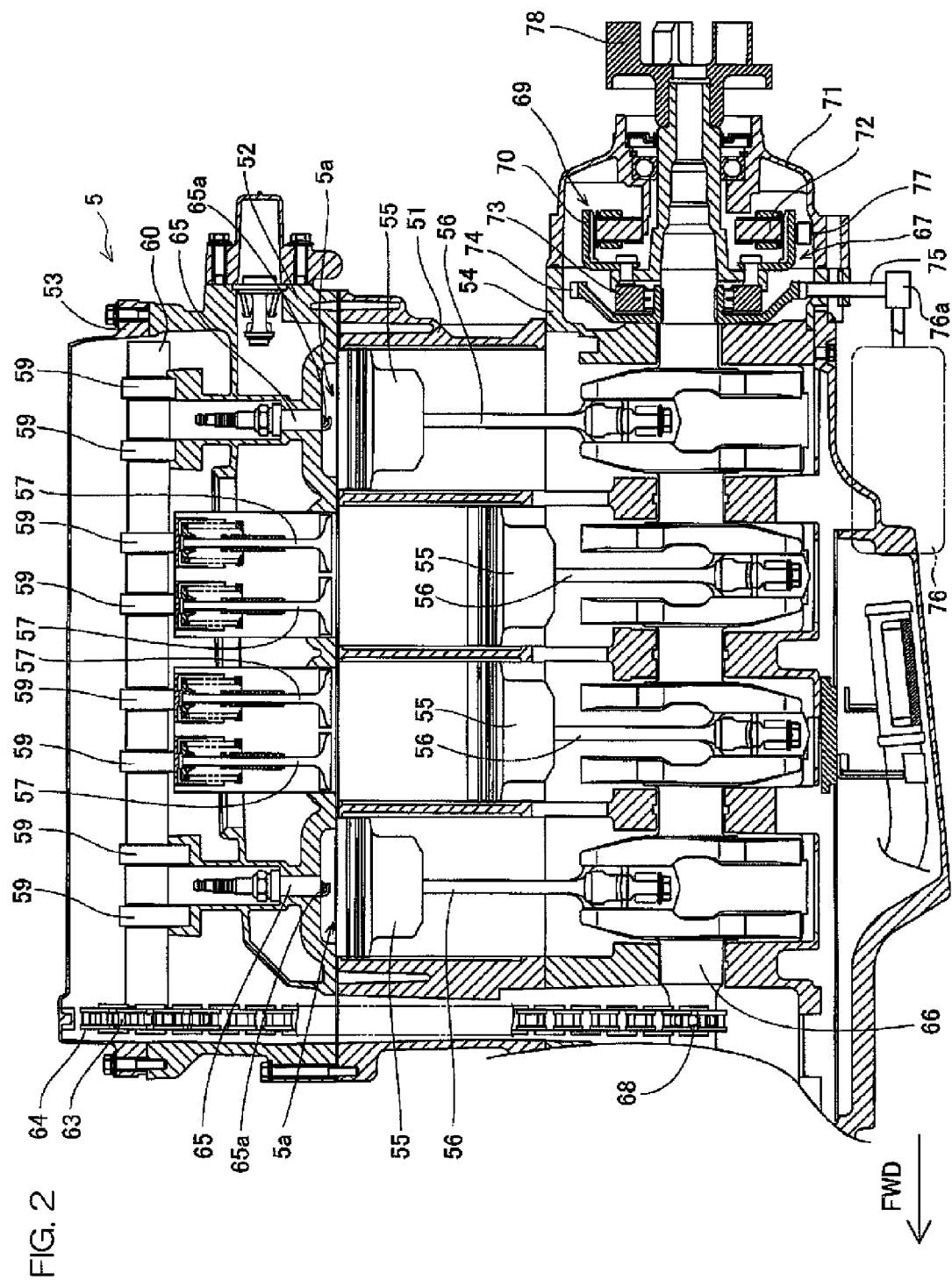
FIG. 2 is a sectional view for describing an arrangement of an engine of the water jet propulsion watercraft.

FIG. 2 is a sectional view of the engine 5. The engine 5 includes a cylinder body 51, a cylinder head 52, a cylinder head cover 53, a crankshaft 66, and a crankcase 54. Four pistons 55 are slidably disposed in the cylinder body 51. To each of the four pistons 55, one end portion of a connecting rod 56 is attached in a rotatable manner. The cylinder head 52 is disposed so as to close an opening at one side of the cylinder body 51. Combustion chambers 5a of the engine 5 are partitioned into respective regions surrounded by the cylinder body 51, the cylinder head 52, and the respective pistons 55.

Figure 3:
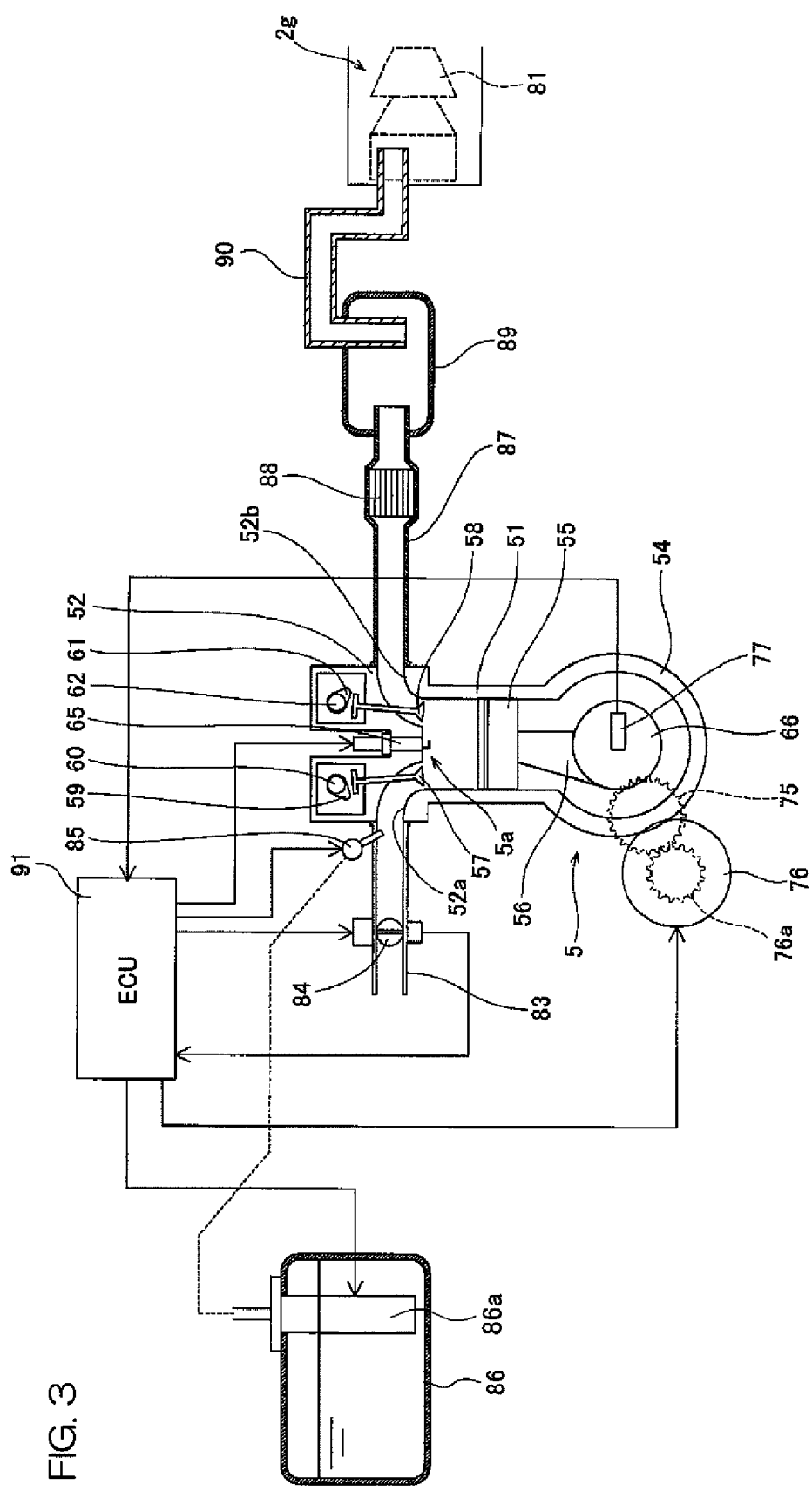
FIG. 3 is a block diagram for describing an arrangement related to the engine of FIG. 1.
Figure 4:
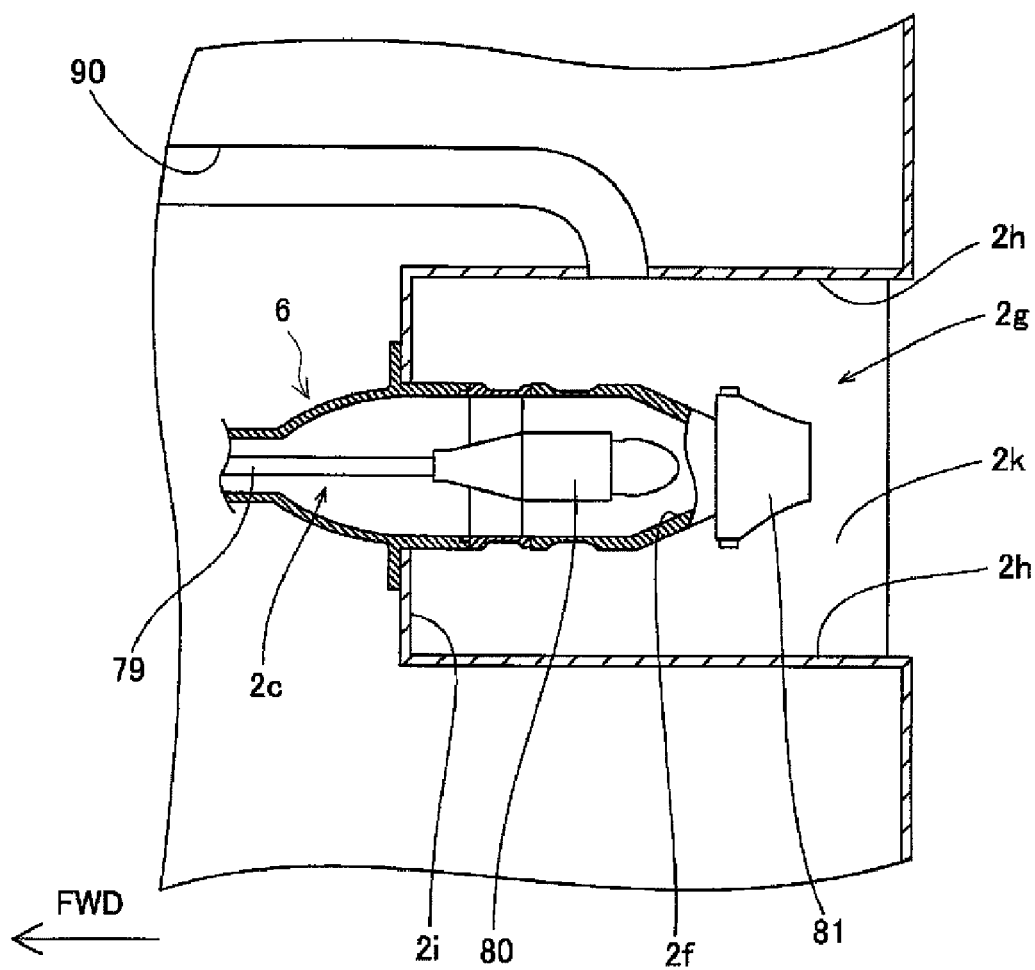
FIG. 4 is a sectional view for describing a structure in a vicinity of a pump chamber of the water jet propulsion watercraft of FIG. 1.

As shown in FIG. 3, the cylinder head 52 is provided with an intake port 52a and an exhaust port 52b. The intake port 52a is connected to the combustion chamber 5a and air and fuel that flow into the combustion chamber 5a pass therethrough. After combustion of the fuel in the combustion chamber 5a, exhaust gas is discharged via the exhaust port 52b. An intake valve 57 and an exhaust valve 58 are disposed in the intake port 52a and the exhaust port 52b, respectively. The intake valve 57 is arranged to be capable of opening and closing the intake port 52a and has a function of adjusting a flow rate of the air that flows into the combustion chamber 5a. The exhaust valve 58 is arranged to be capable of opening and closing the exhaust port 52b and has a function of adjusting a flow rate of the exhaust gas discharged from the combustion chamber 5a.

A cam 59 arranged to move the intake valve 57 at a predetermined timing, and a camshaft 60 arranged to rotate the cam 59 are disposed in the cylinder head 52. Further, a cam 61 arranged to move the exhaust valve 58 at a predetermined timing, and a camshaft 62 arranged to rotate the cam 61 are disposed in the cylinder head 52.

Also, as shown in FIG. 2, a sprocket 63 is attached to one side of the camshaft 60. Likewise, a sprocket (not shown) is also attached to one side of the camshaft 62 (see FIG. 3). A cam chain 64 is engaged with the pair of sprockets.

The cam chain 64 is further engaged with a sprocket 68 of the crankshaft 66. The cam chain 64 is thus driven as the crankshaft 66 rotates. That is, the camshafts 60 and 62 (see FIG. 3) are respectively arranged to be rotated by the crankshaft 66 being rotated. Put in another way, the crankshaft 66 is a drive source that cause the intake valve 57 and the exhaust valve 58 to move (see FIG. 3), respectively.

The cylinder head 52 is provided with four ignition plugs 65 corresponding to the four pistons 55. A tip portion 65a of each ignition plug 65 protrudes toward the corresponding combustion chamber 5a. The cylinder head cover 53 is attached to the cylinder head 52 so as to cover the camshafts 60 and 62 (see FIG. 3).

The crankshaft 66 is disposed so as to extend in a front/rear direction in the crankcase 54. The other end portion of each connecting rod 56 is rotatably attached to the crankshaft 66. The crankshaft 66 is thereby arranged to be rotated while the pistons 55 slide up and down. A rear portion of the crankshaft 66 protrudes to a rear of the crankcase 54 and is housed in an interior of an auxiliary machinery chamber 67. The sprocket 68 is provided on a front side (FWD arrow direction side) portion of the crankshaft 66. The sprocket 68 is engaged with the cam chain 64 as described above. The camshafts 60 and 62 are thereby arranged to rotate respectively with the crankshaft 66 being rotated.

The cams 59 and 61 (see FIG. 3) are arranged to operate so that the exhaust gas, retained in the combustion chamber 5a during starting of the engine 5, can be delivered to the exhaust port 52b. Specifically, the cams 59 and 61 are arranged such that there is a timing at which the intake valve 57 is opened and the exhaust valve 58 is closed when the piston 55 moves downward. The cams 59 and 61 are further arranged such that there is a timing at which the intake valve 57 is closed and the exhaust valve 58 is opened when the piston 55 moves upward.

Referring again to FIG. 2, the auxiliary machinery chamber 67 is arranged to provide a housing space for housing auxiliary machinery accessory to the engine 5, which is the main machinery. One of the auxiliary machinery housed in the auxiliary machinery chamber 67 is a power generating apparatus 69. The power generating apparatus 69 includes a rotor unit 70 and a stator unit 72. The rotor unit 70 is attached to a rear portion of the crankshaft 66. The stator unit 72 is attached to a cover member 71 that forms a rear portion of the auxiliary machinery chamber 67. The power generating apparatus 69 is arranged to generate electricity by the rotor unit 70 being rotated with the rotation of the crankshaft 66.

A gear member 74 is attached via a one-way clutch 73 to the crankshaft 66 in front of the power generating apparatus 69. The gear member 74 is coupled via an intermediate gear 75 to a gear 76a of a starter motor 76. The starter motor 76 has a function of rotating the crankshaft 66 via the intermediate gear 75, the gear member 74, and the one-way clutch 73 when the engine 5 is started.

A crank angle sensor 77 is provided at a side of the rotor unit 70 in the auxiliary machinery chamber 67. The crank angle sensor 77 has a function of detecting rotation of the rotor unit 70. That is, the crank angle sensor 77 is arranged to detect a rotation position of the crankshaft 66. The crank angle sensor 77 is an example of a "detection unit" according to a preferred embodiment of the present invention. The crankshaft 66 is coupled to the intake valve 57 via the cam chain 64, the camshaft 60, and the cam 59. Whether or not the intake valve 57 closes the intake port 52a can thus be detected by detecting a rotation position of the crankshaft 66 by the crank angle sensor 77. Likewise, the crankshaft 66 is coupled to the exhaust valve 58 (see FIG. 3) via the cam chain 64, the camshaft 62 (see FIG. 3), and the cam 61 (see FIG. 3). Whether or not the exhaust valve 58 closes the exhaust port 52b (see FIG. 3) can thus be detected by detecting the rotation position of the crankshaft 66 by the crank angle sensor 77.

As shown in FIG. 1 and FIG. 2, a coupling member 78 is attached to a rear end portion of the crankshaft 66. As shown in FIG. 1, the coupling member 78 is arranged to connect a drive shaft 79 of the jet propulsion device 6 (water jet pump) to the crankshaft 66. The jet propulsion device 6 includes the drive shaft 79 and an impeller 80. The impeller 80 is attached to a rear portion of the drive shaft 79. The impeller 80 is arranged to be rotated with the rotation of the drive shaft 79.

The impeller 80 is disposed in a water passage portion 2c, defined at a lower portion of the hull 2. By rotation of the impeller 80, water surrounding the hull 2 is pumped up from a water inflow portion 2e of a hull bottom 2d to the water passage portion 2c. Further, the water that has been pumped up is passed through the water passage portion 2c and jetted from a water discharge portion 2f at a rear portion of the hull 2 by the rotation of the impeller 80.

The water discharge portion 2f is provided in a pump chamber 2g that is provided at a rear portion of the hull body 2b. The pump chamber 2g is defined by the surrounding five surfaces including a pair of side surface portions 2h (see FIG. 4) provided at respective sides of the water discharge portion 2f, a front surface portion 2i in front of the water discharge portion 2f, an upper surface portion 2j above the water discharge portion 2f, and a lower surface portion 2k below the water discharge portion 2f. A deflector 81 that controls a jetting direction of the water so as to change the direction to the left and right is attached to the water discharge portion 2f. Further, a reverse bucket 82, which reverses the direction of the water jetted from the water discharge portion 2f to the FWD arrow direction during reverse drive, is attached to the water discharge portion 2f.

As shown in FIG. 3, an intake pipe 83 is connected to the intake port 52a of the engine 5. The intake pipe 83 is arranged to provide a passage for flow of air and fuel into the intake port 52a of the engine 5. A throttle valve 84 that adjusts a flow amount of the air that flows into the intake port 52a is arranged in the intake pipe 83. Also, an injector 85 arranged to inject fuel toward the intake port 52a is provided at a downstream side of the throttle valve 84 of the intake pipe 83. The injector 85 is an example of a "fuel injection apparatus" according to a preferred embodiment of the present invention. The injector 85 is connected to a fuel tank 86. The fuel to be injected from the injector 85 is stored in the fuel tank 86.

An exhaust pipe 87 is connected to the exhaust port 52b of the engine 5. The exhaust pipe 87 is an example of an "exhaust channel" according to a preferred embodiment of the present invention. The exhaust pipe 87 is arranged to provide a passage through which the exhaust gas discharged from the exhaust port 52b of the engine 5 flows. A catalyst unit 88, which decomposes the fuel that could not be combusted in the combustion chamber 5a into carbon dioxide, water, etc., is provided in the exhaust pipe 87. Also, a water lock 89, which is arranged to prevent inflow of water into the exhaust pipe 87, is connected to a discharge side of the exhaust pipe 87. Discharge piping 90 is connected to the water lock 89. The discharge piping 90 is connected to the pump chamber 2g and is arranged to discharge the exhaust gas into the pump chamber 2g.

The water lock 89 is preferably a sealed container. At one side wall thereof, the exhaust pipe 87 is introduced into an interior at a position of predetermined height from a bottom wall. An exit end of the exhaust pipe 87 protrudes inward by a predetermined length from the side wall. The discharge piping 90 is introduced from a top wall of the water lock 89 and an entrance end thereof is disposed near the bottom wall. The discharge piping 90 is made, for example, of a resin material. The discharge piping 90 is disposed such that an intermediate portion thereof is higher than a waterline in a stationary state of the watercraft. By this arrangement, the exhaust gas is discharged into water inside the pump chamber 2g and the surrounding water is unlikely to enter into the exhaust pipe 87.

As shown in FIG. 1, an ECU (engine control unit) 91, which controls driving of the engine 5, is arranged on a bulkhead 21 to the rear of the engine 5. The ECU 91 is an example of an "engine control unit" according to a preferred embodiment of the present invention. As shown in FIG. 3, the ECU 91 is connected to the ignition plugs 65, the starter motor 76, the crank angle sensor 77, the throttle valve 84, the injector 85, a fuel pump 86a, etc., of the engine 5. The ECU 91 may be arranged to control not just the engine 5 but also to equipment other than the engine 5 as well. The fuel pump 86a is provided inside the fuel tank 86 and is arranged to deliver the fuel in the fuel tank 86 to the injector 85.

When the engine 5 stops, the ECU 91 judges, based on the detection result of the crank angle sensor 77, whether or not the intake valve 57 is stopped at a position (closed position) closing the intake port 52a. If the intake valve 57 is not stopped at the closed position, the ECU 91 determines that the intake valve 57 is stopped at a position (open position) opening the intake port 52a. Likewise, the ECU 91 judges, based on the detection result of the crank angle sensor 77, whether or not the exhaust valve 58 is stopped at a position closing (closed position) the exhaust port 52b. If the exhaust valve 58 is not stopped at the closed position, the ECU 91 determines that the exhaust valve 58 is stopped at a position (open position) opening the exhaust port 52b.

The ECU 91 is arranged to drive the starter motor 76 if it determines that both the intake valve 57 and the exhaust valve 58 are stopped at the respective open positions when the engine 5 is stopped. More specifically, the ECU 91 is arranged to drive the starter motor 76 until at least one of either the intake valve 57 or the exhaust valve 58 moves to the closed position. It thereby becomes possible to block at least one location in the path leading from the exhaust pipe 87 to the intake port 52a when the driving of the engine 5 is stopped.

Further, when starting of the engine 5 is performed, the ECU 91 is arranged to drive the starter motor 76 for a predetermined period (approximately 3 seconds, for example) in a state where fuel is not injected by the injector 85. When the crankshaft 66 is rotated by the starter motor 76, the piston 55, the intake valve 57, and the exhaust valve 58 are driven. It thereby becomes possible to deliver the exhaust gas retained in the intake side of the combustion chamber 5a relative to the exhaust port 52b, to the exhaust pipe 87 side of the combustion chamber 5a in advance before the fuel is injected.

Figure 5:
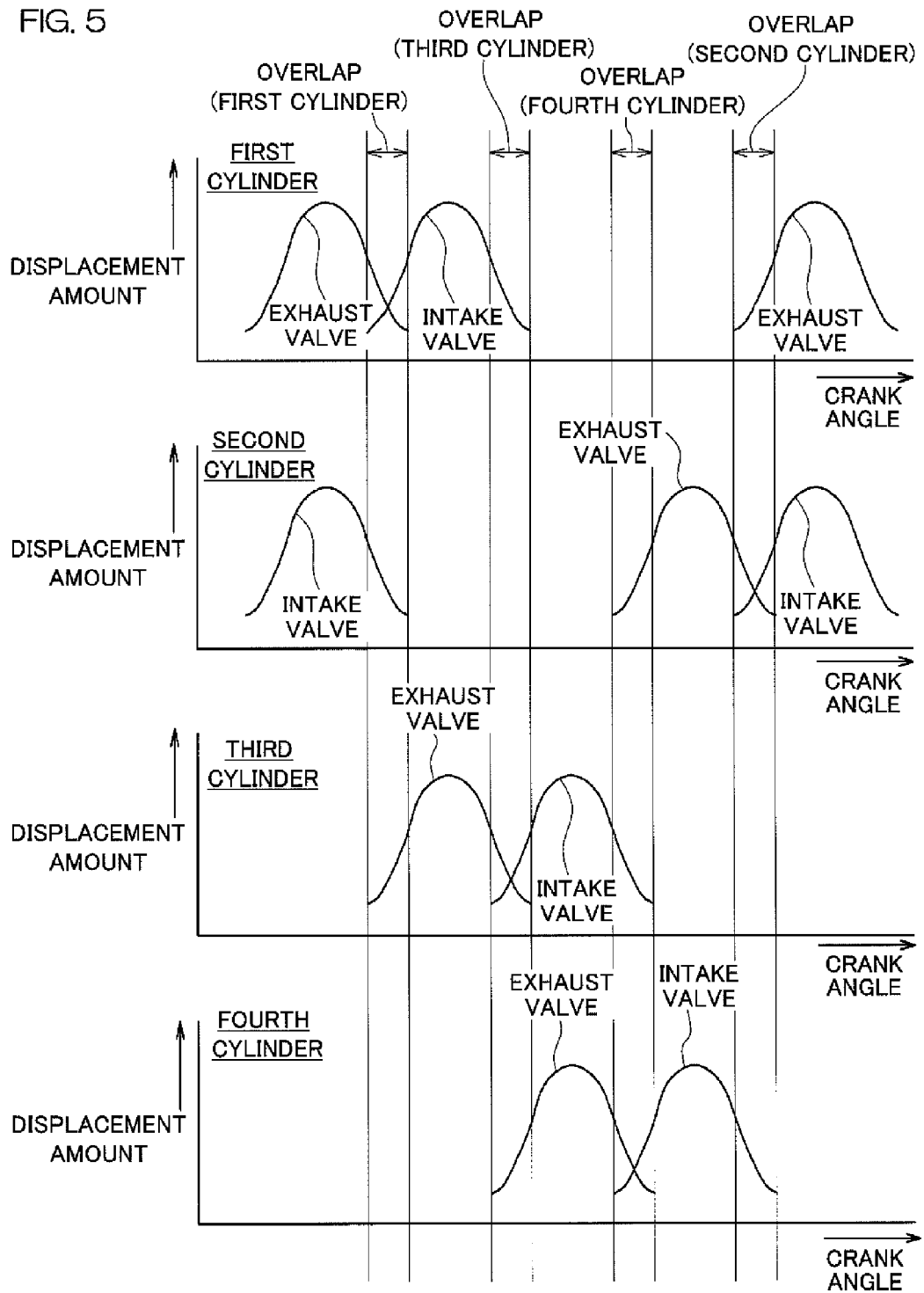
FIG. 5 is a diagram for describing operation timings of intake valves and exhaust valves of four cylinders.

FIG. 5 is a diagram for describing operations of the intake valves 57 and the exhaust valves 58 of the four cylinders provided in the engine 5. The engine 5 is, for example, a serial, four-cylinder, four-cycle engine. The four cylinders that are aligned in series will be referred to as the first cylinder, the second cylinder, the third cylinder, and the fourth cylinder in that order from the front side. Successive ignition in the first to the fourth cylinders is to be performed cyclically in the order of: first cylinder→fourth cylinder→third cylinder→second cylinder→first cylinder→ . . . . In each cylinder, the exhaust valve 58 is displaced to open and close the exhaust port 52b and in succession, the intake valve 57 is displaced to open and close the intake port 52a. The intake valve 57 begins to be displaced in an opening direction before the exhaust valve 58 is completely closed, so that there is an overlap period in which both the exhaust valve 58 and the intake valve 57 are in the open state. The ignition timings of the four cylinders are shifted and thus the overlap periods of the four cylinders are shifted with respect to each other and do not overlap. That is, four overlap periods that are separated in time occur while the crank angle is angularly displaced by 720 degrees (two rotations). In each overlap period, a communication path leads from the exhaust pipe 87 to the intake pipe 83 through the combustion chamber in the corresponding cylinder.

Figure 6:
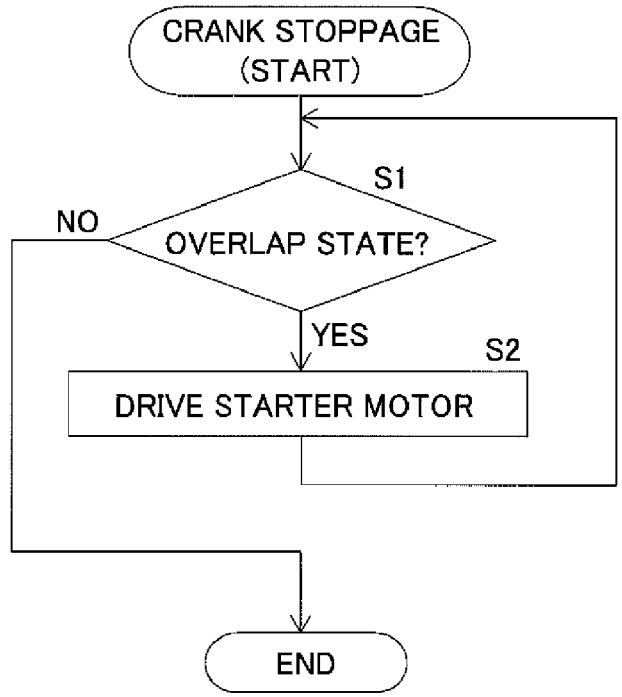
FIG. 6 is a flowchart for describing a process performed by an ECU when driving of the engine of the water jet propulsion watercraft is stopped.

Details of the control executed by the ECU 91 when the engine 5 is stopped will now be described with reference to FIG. 3 and FIG. 6. When the engine 5 is stopped, the ECU 91 executes the control for stopping at least one of either the intake valve 57 or the exhaust valve 58 at the position at which at least one of either the intake port 52a or the exhaust port 52b is closed.

When a user operates an unillustrated engine stop switch of the engine 5 (see FIG. 3), the ECU 91 determines whether or not both the intake valve 57 and the exhaust valve 58 are stopped at the respective open positions (whether or not the valves are in the overlap state) (step S1). Specifically, the ECU 91 computes displacement amounts of both the intake valves 57 and the exhaust valves 58 of the respective cylinders based on the crank angle (position of the crankshaft 66) detected by the crank angle sensor 77. Then, based on the computed displacement amounts, the ECU 91 determines whether or not both the intake valve 57 and the exhaust valve 58 are stopped at the respective open positions in any of the cylinders. If the crank angle range corresponding to the overlap period is known, the ECU 91 may determine whether or not both the intake valve 57 and the exhaust valve 58 are in the open states by determining whether or not the crank angle is within the overlap period (see FIG. 5).

If it is determined that both the intake valve 57 and the exhaust valve 58 are stopped at the respective open positions in any of the cylinders (step S1: YES), the ECU 91 drives the starter motor 76 by a predetermined drive amount. Thereafter, the ECU 91 repeats the process from step S1. That is, after driving the starter motor 76 by the predetermined drive amount, the ECU 91 drives the starter motor 76 again if it judges that both the intake valve 57 and the exhaust valve 58 are stopped at the respective open positions in any of the cylinders.

If it is determined that both the intake valve 57 and the exhaust valve 58 are not stopped at the respective open positions in any of the cylinders (step S1: NO), that is, if the crank angle does not correspond to any of the overlap periods, the ECU 91 ends the process. Even after the engine 5 (crankshaft 66) is stopped, the ECU 91 continues operation without stopping to perform the control process of steps S1 and S2 described above.

Figure 7:
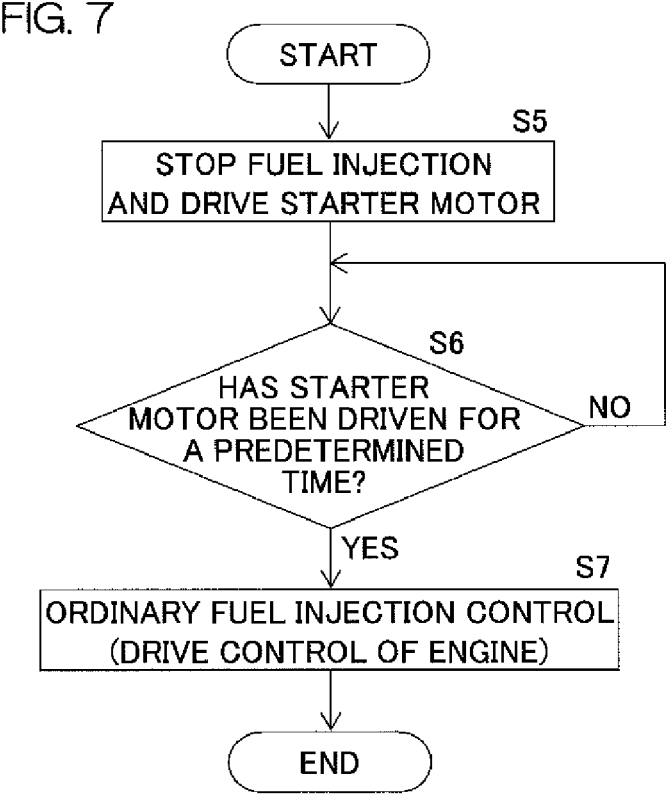
FIG. 7 is a flowchart for describing a process performed by the ECU when the engine of the water jet propulsion watercraft is started.

Next, details of the control executed by the ECU 91 when the engine 5 is started will now be described with reference to FIG. 3 and FIG. 7. When the engine 5 is started, the ECU 91 executes the control for delivering the exhaust gas, retained at the intake side relative to the exhaust port 52*b*, to the exhaust pipe 87 side.

When the user operates an unillustrated engine start switch of the engine 5 (see FIG. 3), the ECU 91 drives the starter motor 76 in a state of prohibiting the fuel injection from the injector 85 (step S5). The ECU 91 then determines whether the starter motor 76 has been driven for a predetermined period (3 seconds, for example) (step S6). For example, the crankshaft 66 may be arranged to rotate approximately five times when the starter motor 76 is driven for 3 seconds. The ECU 91 continues the driving of the starter motor 76 until the predetermined time elapses (step S6).

When the ECU 91 determines that the starter motor 76 has been driven for the predetermined period (3 seconds, for example) (step S6: YES), it starts control for causing the fuel to be injected from the injector 85 (step S7). The ECU 91 thus ends the control for delivering the exhaust gas, retained at the intake side relative to the exhaust port 52*b*, to the exhaust pipe 87 side and then starts the drive control of the engine 5. In the period until the engine 5 is started, the ECU 91 determines the amount of fuel injected from the injector 85 in accordance with a start map that defines the fuel injection amount for starting and controls the injector 85 according to this fuel injection amount. The start map is a map by which the fuel injection amount is set in advance, for example, according to an engine temperature, intake temperature, atmospheric pressure, throttle opening, etc.

The process in step S6 is a process of setting the fuel injection amount to zero regardless of the setting value of the start map. However, the fuel injection amount applied in the process of step S6 does not necessarily have to be zero, and a fuel injection amount that is less than an ordinary fuel injection amount applied during starting may be applied.

As described above, in the first preferred embodiment, at least one location in the path leading from the exhaust pipe 87 to the intake port 52*a* is blocked when the driving of the engine 5 is stopped. The exhaust gas retained in the exhaust pipe 87 can thereby be suppressed from flowing to the intake side. For example, if the hull 2 receives a wave from the rear when the engine 5 is stopped, water is introduced into the water lock 89 via the discharge piping 90. The air inside the water lock 89 is thereby compressed and the air inside the water lock 89 thus flows into the exhaust pipe 87. At this time, if the path leading from the exhaust pipe 87 to the intake pipe 83 through the combustion chamber 5*a* is open, the exhaust gas retained inside the exhaust pipe 87 is forced toward the combustion chamber 5*a* and the intake side. However, in the present preferred embodiment, the flow of the exhaust gas, retained in the exhaust pipe 87, to the intake side can be minimized or prevented because at least one location in the path leading from the exhaust pipe 87 to the intake port 52*a* (at least one of either the intake port 52*a* or the exhaust port 52*b*) is blocked. Difficulty in igniting the fuel in restarting the engine 5 can thus be suppressed. Consequently, the engine 5 can be restarted smoothly. Further, by improvement of a restarting property of the engine 5, an emission amount of non-combusted fuel can be suppressed. In addition, combustion of fuel in the catalyst 88 can be suppressed because a large amount of non-combusted fuel can be suppressed from reaching the catalyst 88. The catalyst 88 can thereby be protected against abnormal overheating.

Specifically, in the first preferred embodiment, the ECU 91 drives the starter motor 76 by the predetermined drive amount when the engine 5 is stopped. If the ECU 91 thereafter judges that both the intake valve 57 and the exhaust valve 58 are stopped at the respective open positions, it drives the starter motor 76 again. At least one of either the intake port 52*a* or the exhaust port 52*b* can thereby be closed reliably when the engine 5 is stopped.

Also, in the first preferred embodiment, after the engine 5 is stopped, the ECU 91 repeats the driving of the starter motor 76 on the basis of the detection result of the crank angle sensor 77 until the overlap state is canceled. The control of closing at least one of either the intake port 52*a* or the exhaust port 52*b* can thereby be performed readily even after the engine 5 is stopped.

Further, in the first preferred embodiment, when the starting of the engine 5 is performed, the ECU 91 drives the starter motor 76 for the predetermined period (approximately 3 seconds, for example) in the state where the fuel is not injected from the injector 85. The exhaust gas retained in the intake side relative to the exhaust port 52*b* is thereby delivered to the exhaust pipe 87 side. Gases of components that hinder combustion (for example, carbon dioxide and other gases besides oxygen) can thereby be discharged from the combustion chamber 5*a* in advance. Fuel injection from the injector 85 is thus started after the concentrations of these components have been lowered in advance. The injected fuel can thereby be ignited reliably after the start of fuel injection. Consequently, the engine 5 can be restarted more smoothly.

Second Preferred Embodiment

Next, an arrangement of an engine of a water jet propulsion watercraft according to a second preferred embodiment of the present invention will now be described in detail with reference to FIG. 8 to FIG. 10. In the second preferred embodiment, the engine 105 includes a variable timing actuator 192 that is capable of changing the timing at which the intake valve 57 is moved.

Figure 8:
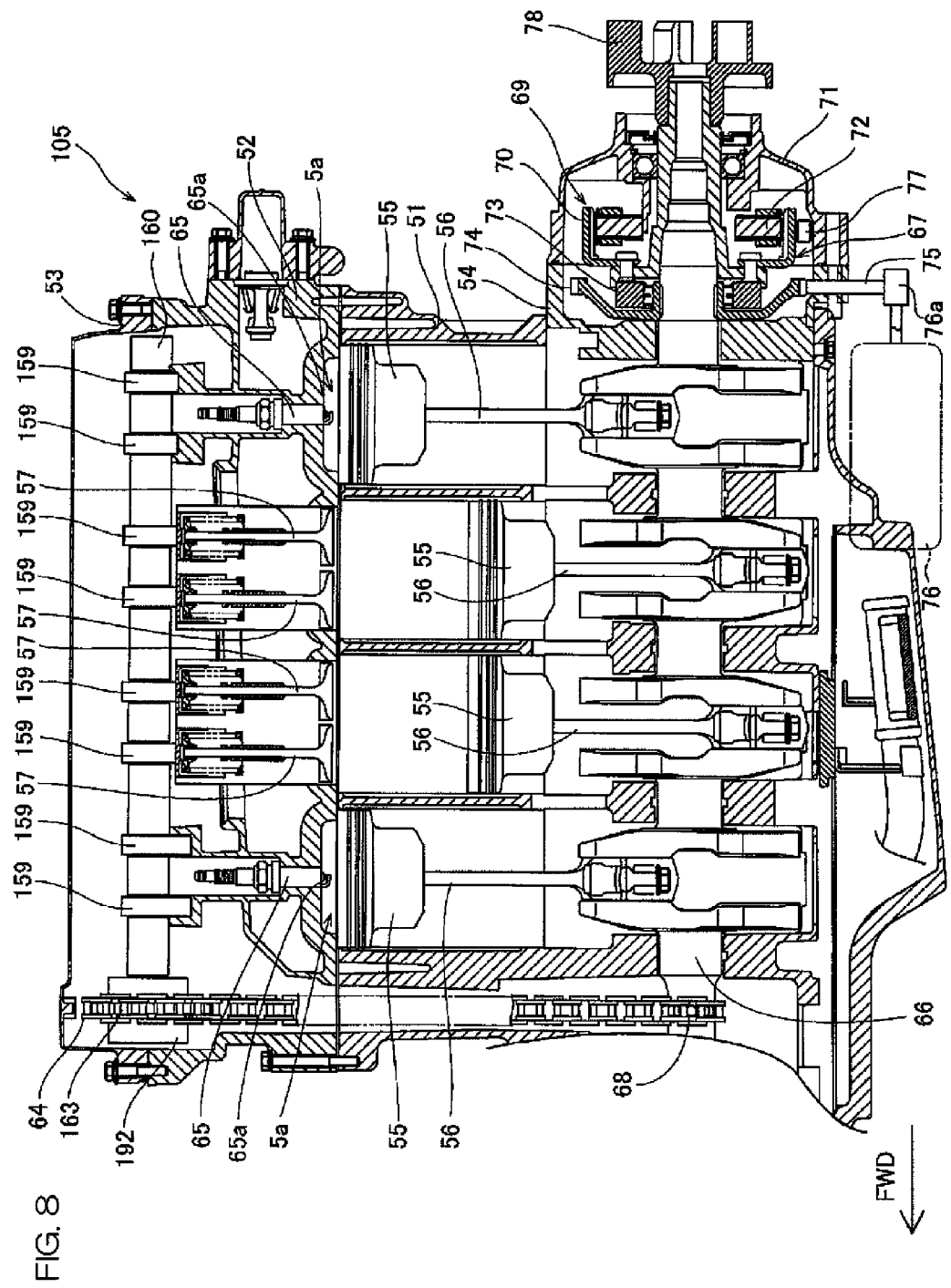
FIG. 8 is a sectional view for describing an arrangement of an engine of a water jet propulsion watercraft according to a second preferred embodiment of the present invention.

FIG. 8 is a sectional view of the engine 5 according to the second preferred embodiment. Cams 159 arranged to move the intake valves 57 at predetermined timings, and a camshaft 160 arranged to rotate the cams 159, are arranged in the cylinder head 52. Each cam 159 is an example of a "first cam portion" according to a preferred embodiment of the present invention. A sprocket 163 is provided at one side of the camshaft 160. The cam chain 64 is engaged with the sprocket 163.

The variable timing actuator 192 is provided between the camshaft 160 and the sprocket 163. The variable timing actuator 192 is arranged to change the timing at which each intake valve 57 is moved by shifting the phases at which the sprocket 163 and the camshaft 160 are rotating. As the variable timing actuator 192, for example, a variable valve timing mechanism disclosed in U.S. Pat. No. 5,724,929 may be applied, and the disclosure of this United States patent is incorporated herein by reference.

Figure 9:
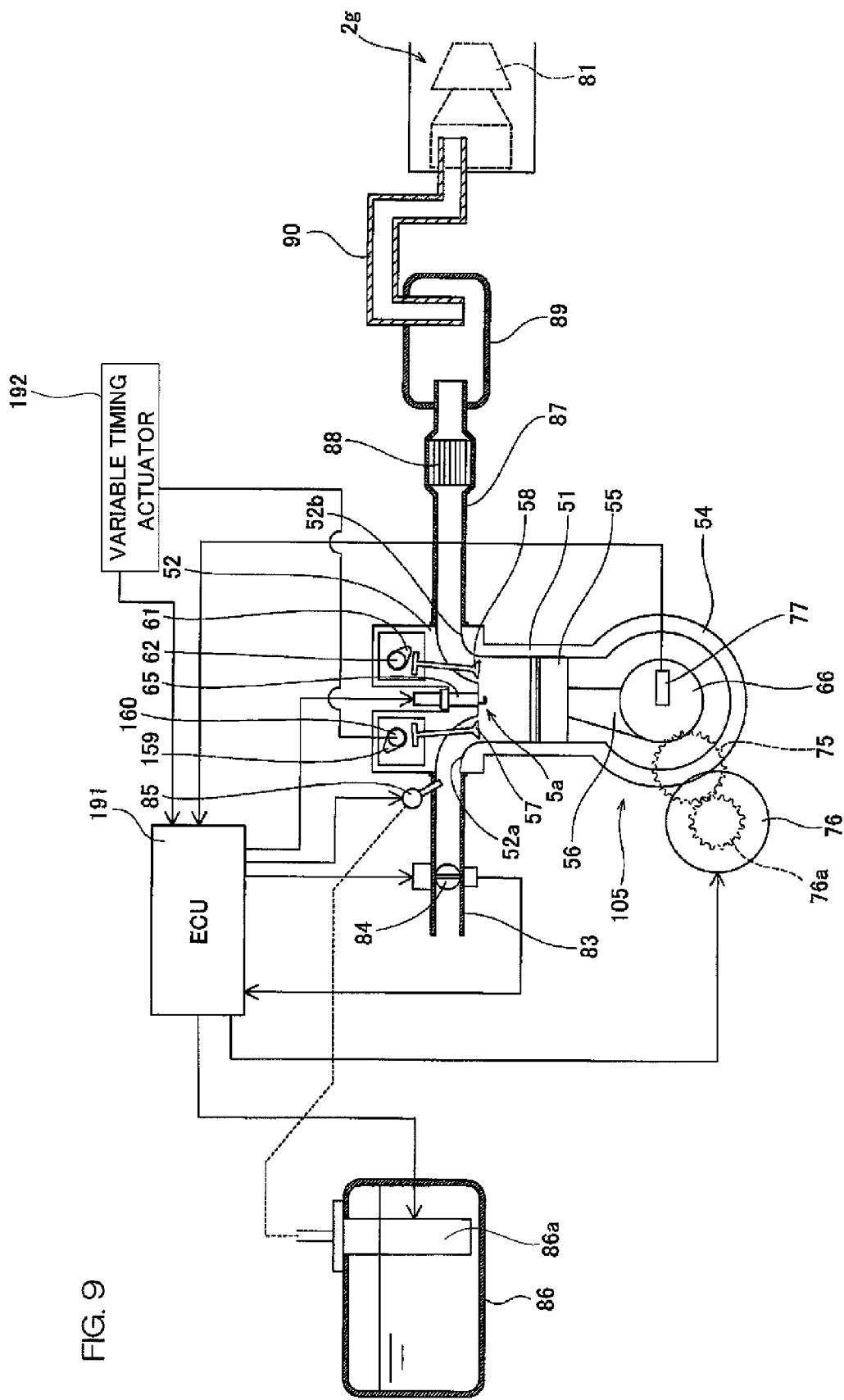
FIG. 9 is a block diagram for describing an arrangement related to the engine of the water jet propulsion watercraft according to the second preferred embodiment of the present invention.

The variable timing actuator 192 is connected to an ECU 191 as shown in FIG. 9 and is arranged to be driven and controlled by the ECU 191. The ECU 191 changes the rotation timing of the cam 159 between when the engine 105 is driven and when the engine 105 is stopped. The timing at which each intake valve 57 is moved is thereby changed between when the engine 105 is driven and when it is stopped.

Figure 10:
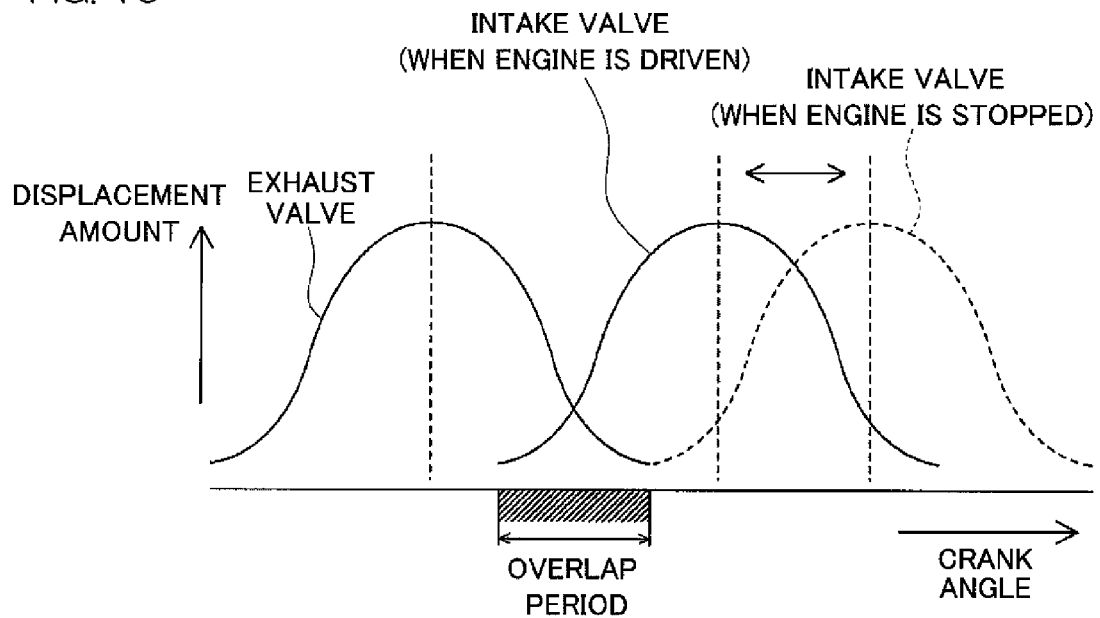
FIG. 10 is a diagram for describing a change of movement timing of an intake valve of the engine of the water jet propulsion watercraft according to the second preferred embodiment of the present invention.

FIG. 10 is a diagram of movement timings of the intake valve 57 and the exhaust valve 58 in a certain cylinder. In regard to the displacement amount of the intake valve 57, the displacement amount when the engine 105 is driven is indicated by a solid line and the displacement amount when the engine 105 is stopped is indicated by a broken line. The movement timing of the exhaust valve 58 with respect to the crank angle is fixed.

During the driving of the engine 105, the ECU 191 controls the variable timing actuator 192 such that an overlap period occurs in which the intake port 52a and the exhaust port 52b are opened simultaneously. Meanwhile, when the engine 105 is stopped, the ECU 191 controls the variable timing actuator 192 such that the overlap period, in which the intake port 52a and the exhaust port 52b are opened simultaneously, does not occur. That is, the displacement curve (when the engine is driven) of the intake valve 57 expressed by the solid line is shifted to the displacement curve (when the engine is stopped) of the intake valve 57 expressed by the broken line. The phase of the movement timing of the intake valve 57 with respect to the crank angle is thereby shifted. Consequently, the overlap period can be eliminated and it thus becomes possible to prevent the intake port 52a and the exhaust port 52b from being opened simultaneously. The ECU 191 is an example of the "engine control unit" according to a preferred embodiment of the present invention.

The structure besides the above of the second preferred embodiment is the same as that of the first preferred embodiment.

Figure 11:
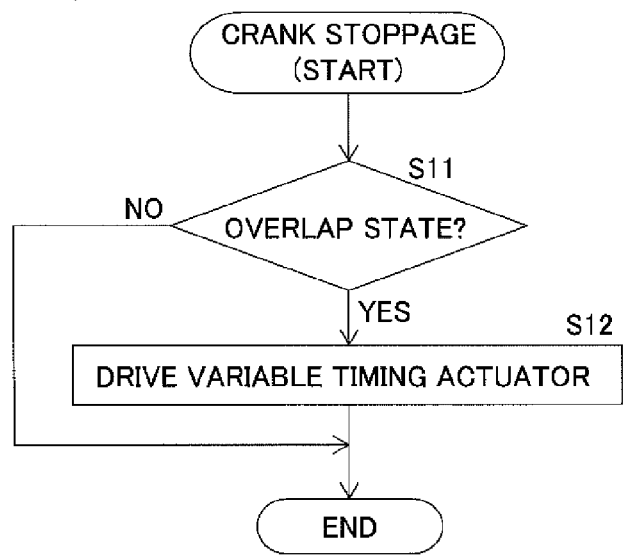
FIG. 11 is a flowchart for describing a process performed by an ECU when driving of the engine of the water jet propulsion watercraft according to the second preferred embodiment of the present invention is stopped.

Details of the control executed by the ECU 191 when the driving of the engine 105 is stopped will now be described with reference to FIG. 9 and FIG. 11.

When the user operates an unillustrated engine stop switch of the engine 105 (see FIG. 9), the ECU 191 determines whether or not both the intake valve 57 and the exhaust valve 58 are stopped at the respective open positions (whether or not the valves are in the overlap state) (step S11). Specifically, the ECU 191 computes the displacement amounts of both the intake valves 57 and the exhaust valves 58 of the respective cylinders based on the crank angle (position of the crankshaft 66) detected by the crank angle sensor 77. Then, based on the computed displacement amounts, the ECU 191 determines whether or not both the intake valve 57 and the exhaust valve 58 are stopped at the respective open positions in any of the cylinders. If the crank angle range corresponding to the overlap period is known, the ECU 191 may determine whether or not both the intake valve 57 and the exhaust valve 58 are in the open state by determining whether or not the crank angle is within the overlap period (see FIG. 5).

If it is determined that both the intake valve 57 and the exhaust valve 58 are stopped at the respective open positions in any of the cylinders (step S11: YES), the ECU 191 drives the variable timing actuator 192 (step S12). The rotation phases of the camshaft 160 and the sprocket 163 are thereby shifted such that the overlap period, in which the intake port 52a and the exhaust port 52b are opened simultaneously, does not occur. Thereafter, the operation of the ECU 191 ends after the stoppage of the engine 105.

If it is determined that both the intake valve 57 and the exhaust valve 58 are not stopped at the respective open positions in any of the cylinders (step S11: NO), that is, if the crank angle does not correspond to any of the overlap periods, the ECU 191 ends the process after the stoppage of the engine 105 without driving the variable timing actuator 192. Even after the engine 105 (crankshaft 66) is stopped, the ECU 191 continues operation without stopping for a predetermined time to perform the control process of steps S11 and S12 as described above.

As described above, in the second preferred embodiment, the ECU 191 is arranged to change the rotation timing of the cam 159 between when the engine 105 is driven and when the engine 105 is stopped. The overlap is thus canceled by the change of the timing at which the intake valve 57 is moved. Thus, by an easy control, the intake port 52a and the exhaust port 52b can be prevented from opening simultaneously when the engine 105 is stopped.

Third Preferred Embodiment

Next, an arrangement of an engine of a water jet propulsion watercraft according to a third preferred embodiment of the present invention will now be described in detail with reference to FIG. 12 to FIG. 14. In the third preferred embodiment, the engine 205 includes camshaft moving cams 293 that are arranged to move the positions of cams 261 that make the exhaust valves 58 move.

Figure 12:
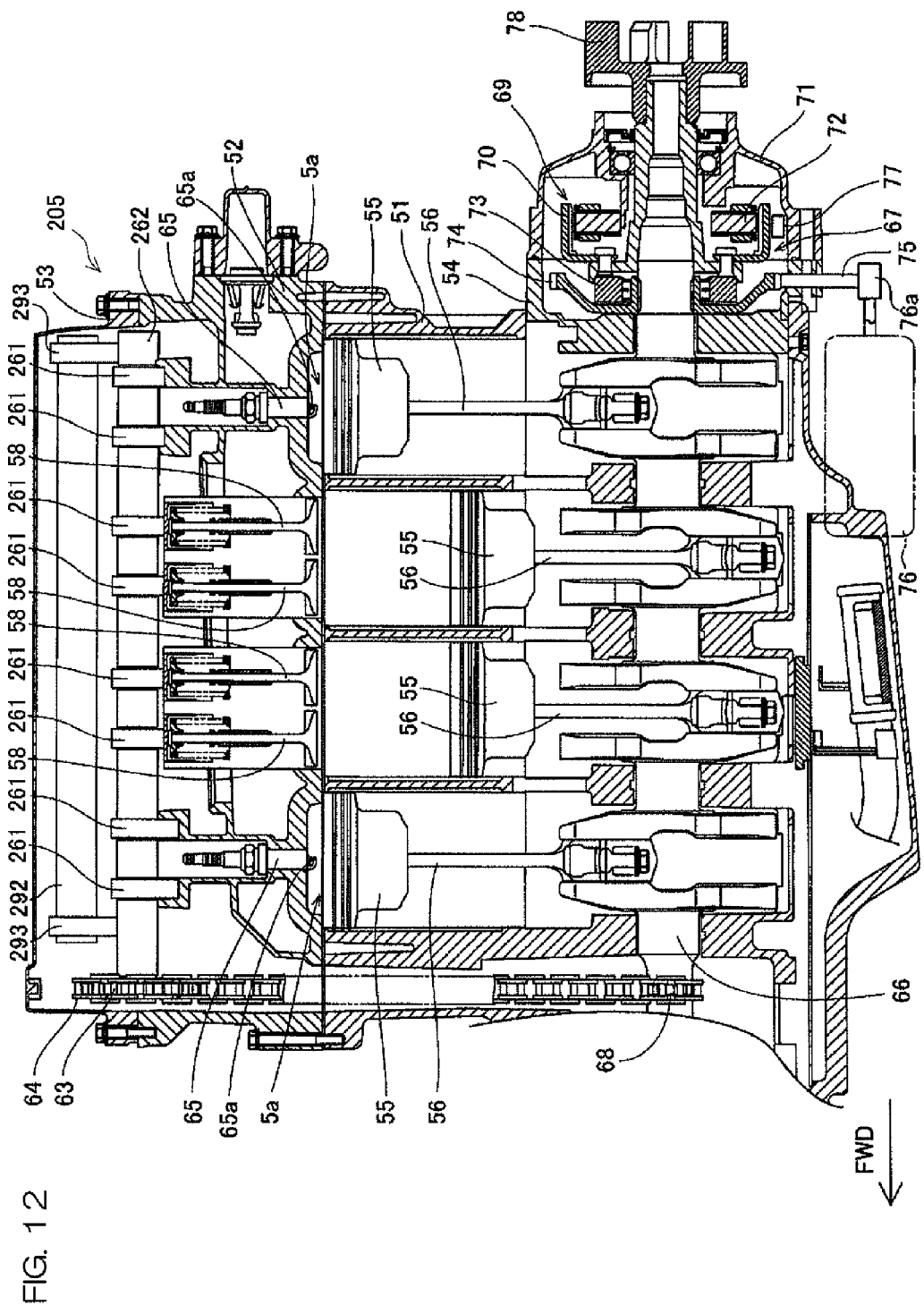
FIG. 12 is a sectional view for describing an arrangement of an engine of a water jet propulsion watercraft according to a third preferred embodiment of the present invention.

FIG. 12 is a sectional view of the engine 205. In FIG. 12, a section at the exhaust valve 58 side is shown at a portion of the cylinder head 52. The cams 261 arranged to move the exhaust valves 58 at predetermined timings, and a camshaft 262 arranged to rotate the cams 261, are arranged in the cylinder head 52. Each cam 261 is an example of a "second cam portion" according to a preferred embodiment of the present invention. A sprocket 263 is provided at one side of the camshaft 262. The cam chain 64 is engaged with the sprocket 263.

Each of the plurality of cams 261 is arranged to be movable in an up/down direction with respect to the exhaust valve 58. Specifically, a movement camshaft 292, extending in the front/rear direction in the same manner as the camshaft 262, is disposed above the camshaft 262. To the movement camshaft 292, a pair of camshaft moving cams 293 are attached, for example, near respective end portions. Each of the pair of camshaft moving cams 293 is arranged to be rotatable with the movement camshaft 292 being rotated. Each of the pair of camshaft moving cams 293 is arranged to press the camshaft 262. The pair of camshaft moving cams 293 are arranged to be capable of moving the position of the camshaft 262 in the up/down direction in accordance with the rotation of the pair of camshaft moving cams 293. It thereby becomes possible to move the position of the cams 261, provided on the camshaft 262, in the up/down direction. Consequently, for example, when the cam 261 is moved in the up direction, the exhaust valve 58 is not moved so much as to open the exhaust port 52b even when the cam 261 pushes the exhaust valve 58 downward (in the direction of opening the exhaust port 52b).

Figure 13:
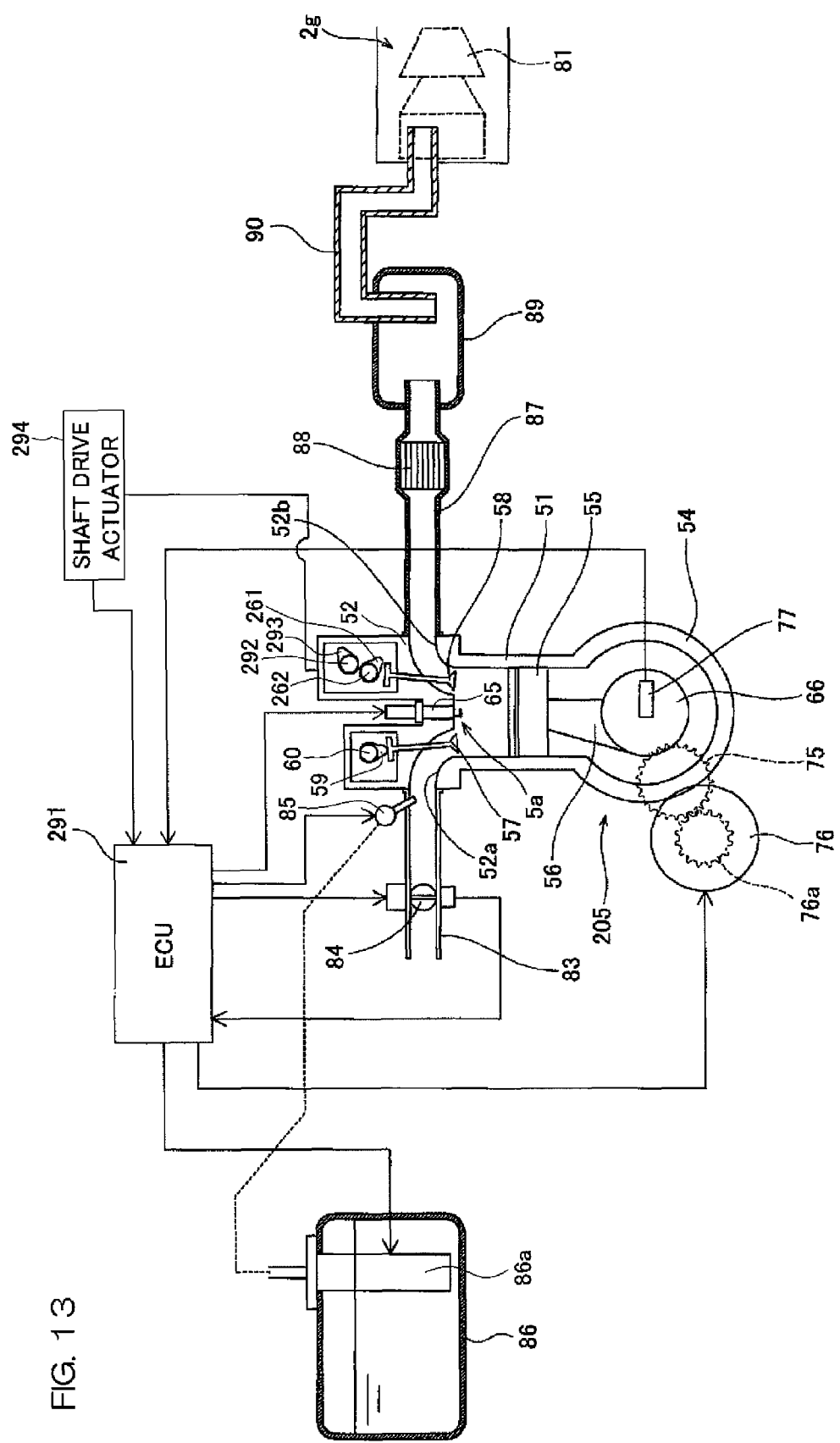
FIG. 13 is a block diagram for describing an arrangement related to the engine of the water jet propulsion watercraft according to the third preferred embodiment of the present invention.

A shaft drive actuator 294 is connected to the movement camshaft 292 as shown in FIG. 13. The movement camshaft 292 is arranged to be rotatable with the shaft drive actuator 294 being driven. The shaft drive actuator 294 is connected to an ECU 291 and is arranged to be driven and controlled by the ECU 291. The ECU 291 changes the displacement amount of the exhaust valve 58 by changing the position of the cam 261 between when the engine 205 is driven and when the engine 205 is stopped.

Figure 14:
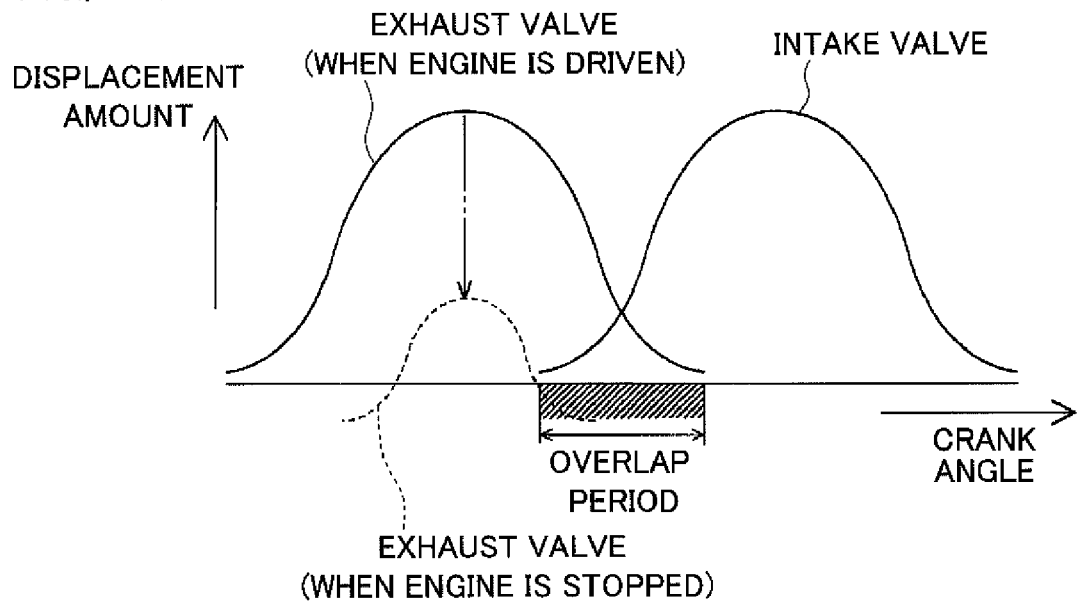
FIG. 14 is a diagram for describing a change of displacement amount of an exhaust valve of the engine of the water jet propulsion watercraft according to the third preferred embodiment of the present invention.

FIG. 14 is a diagram of displacement amounts of the intake valve 57 and the exhaust valve 58 in a certain cylinder. In regard to the displacement amount of the exhaust valve 58, the displacement amount when the engine 205 is driven is indicated by a solid line and the displacement amount when the engine 205 is stopped is indicated by a broken line. In this preferred embodiment, the displacement amount of the intake valve 57 is not changed between when the engine 205 is driven and when it is stopped.

During the driving of the engine 205, the ECU 291 controls the shaft drive actuator 294 such that an overlap period in which the intake port 52a and the exhaust port 52b are opened simultaneously, occurs. When the engine 205 is stopped, on the other hand, the ECU 291 controls the shaft drive actuator 294 such that the overlap period, in which the intake port 52a and the exhaust port 52b are opened simultaneously, does not occur. That is, the displacement curve (when the engine is driven) of the exhaust valve 58 expressed by the solid line is shifted to the displacement curve (when the engine is stopped) of the exhaust valve 58 expressed by the broken line. A maximum displacement amount of the exhaust valve 58 is thereby minimized to a small amount. Consequently, the overlap period can be eliminated and it thus becomes possible to prevent the intake port 52a and the exhaust port 52b from being opened simultaneously. The ECU 291 is an example of the "engine control unit" according to a preferred embodiment of the present invention.

The structure besides the above of the third preferred embodiment is the same as that of the first preferred embodiment.

Figure 15:
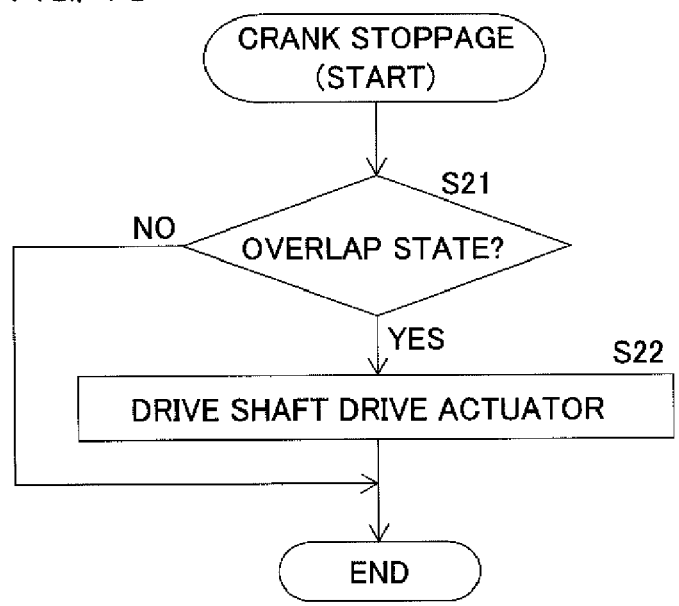
FIG. 15 is a flowchart for describing a process performed by an ECU when driving of the engine of the water jet propulsion watercraft according to the third preferred embodiment of the present invention is stopped.

Details of the control executed by the ECU 291 when the driving of the engine 205 is stopped will now be described with reference to FIG. 13 and FIG. 15.

When the user operates an unillustrated engine stop switch of the engine 205 (see FIG. 13), the ECU 291 determines whether or not both the intake valve 57 and the exhaust valve 58 are stopped at the respective open positions (whether or not the valves are in the overlap state) (step S21). Specifically, the ECU 291 computes the displacement amounts of both the intake valves 57 and the exhaust valves 58 of the respective cylinders based on the crank angle (position of the crankshaft 66) detected by the crank angle sensor 77. Then, based on the computed displacement amounts, the ECU 291 determines whether or not both the intake valve 57 and the exhaust valve 58 are stopped at the respective open positions in any of the cylinders. If the crank angle range corresponding to the overlap period is known, the ECU 291 may determine whether or not both the intake valve 57 and the exhaust valve 58 are in the open state by determining whether or not the crank angle is within the overlap period (see FIG. 5).

If it is determined that both the intake valve 57 and the exhaust valve 58 are stopped at the respective open positions in any of the cylinders (step S21: YES), the ECU 291 drives the shaft drive actuator 294 (step S22). The movement camshaft 292 is thereby rotated and protruding portions of the pair of camshaft moving cams 293 are thereby rotated upward.

The camshaft 262 is thereby moved upward and the cams 261 move upward. Consequently, the exhaust valves 58 also move upward by amounts corresponding to the upward movement of the cams 261, and the displacement amounts of the exhaust valves 58 are minimized to small amounts. Thereafter, the driving by the ECU 291 is ended and the process ends. Even after the engine 205 (crankshaft 66) is stopped, the ECU 291 continues operation without stopping for a predetermined time to perform the control process of steps S21 and S22 described above.

If it is determined that both the intake valve 57 and the exhaust valve 58 are not stopped at the respective open positions in any of the cylinders (step S21: NO), that is, if the crank angle does not correspond to any of the overlap periods, the ECU 291 ends the process after the stoppage of the engine 205 without driving the shaft drive actuator 294.

As described above, in the third preferred embodiment, the ECU 291 is arranged to change the position of each cam 261 between when the engine 205 is driven and when the engine 205 is stopped. The displacement amount of each exhaust valve 58 is thereby minimized, and the intake port 52a and the exhaust port 52b can be prevented from opening simultaneously when the engine 205 is stopped.

Other Preferred Embodiments

It is to be understood that the preferred embodiments disclosed herein are by all means illustrative and not restrictive. The scope of the present invention is defined by the claims and not by the preceding description of the preferred embodiments, and all changes that fall within the meets and bounds of the claims or equivalence of such meets and bounds are therefore intended to be embraced by the claims.

For example, with each of the first to third preferred embodiments, although an example where the present invention is applied to a saddle type water jet propulsion watercraft has been described, the present invention is not restricted thereto. The present invention may be applied to a water jet propulsion watercraft other than a saddle type water jet propulsion watercraft, such as to a pleasure boat (sport boat) that includes a seat of a type other than a saddle type.

Also, with each of the first to third preferred embodiments, an example where at least one location in the path leading from the exhaust pipe to the intake port is blocked by moving at least one of either the intake valve or the exhaust valve when the driving of the engine is stopped, has been described. However, the present invention is not restricted thereto, and for example, at least one location in the path leading from the exhaust pipe to the intake port may be blocked by blocking the exhaust pipe by a regulator valve provided in the exhaust pipe to adjust a flow rate of the exhaust gas.

Also, with the first preferred embodiment, an arrangement where the starter motor is driven to move at least one of either the intake valve or the exhaust valve to close at least one of either the intake port or the exhaust port when the driving of the engine is stopped, has been described. However, the present invention is not restricted thereto, and arrangements can be made to drive the starter motor until the exhaust valve is moved so as to close the exhaust port. Or, arrangements can be made to drive the starter motor to move both the intake valve and the exhaust valve so as to close both the intake port and the exhaust port. Reverse flow of the exhaust gas to the intake side relative to the combustion chamber can thereby be suppressed more effectively and the engine can thus be restarted smoothly.

Also, with the second preferred embodiment, an arrangement where the movement timing of the intake valve is changed by changing the rotation timing of the cam corresponding to the intake valve between when the engine is driven and when it is stopped, has been described. However, the present invention is not restricted thereto, and arrangements may be made to change the movement timing of the exhaust valve by changing the rotation timing of the cam corresponding to the exhaust valve between when the engine is driven and when it is stopped. Or, arrangements may be made to change the movement timings of both the intake valve and the exhaust valve by respectively changing the rotation timings of the cams respectively corresponding to both the intake valve and the exhaust valve.

Also, with the third preferred embodiment, an arrangement where the displacement amount of the exhaust valve is suppressed by changing the position of the cam corresponding to the exhaust valve between when the engine is driven and when it is stopped, has been described. However, the present invention is not restricted thereto, and arrangements may be made to suppress the displacement amount of the intake valve by changing the position of the cam corresponding to the intake valve between when the engine is driven and when it is stopped. Further, arrangements may be made to suppress the displacement amounts of both the intake valve and the exhaust valve by changing the positions of the respective cams corresponding to both the intake valve and the exhaust valve.

Also, with each of the second and third preferred embodiments, an arrangement where the variable timing actuator and the shaft drive actuator are respectively driven when it is determined that the intake valve and the exhaust valve are in the overlap state, in which both valves are stopped at the respective open positions when the engine is stopped, has been described. However, the present invention is not restricted thereto, and the variable timing actuator and the shaft drive actuator may respectively be driven to close at least one of either the intake port or the exhaust port without determining whether or not the valves are in the overlap state when the driving of the engine is stopped.

Also, with the first preferred embodiment, an example where the control of delivering the exhaust gas, retained at the intake side relative to the exhaust port, to the exhaust pipe side is performed when the engine is started, has been described. However, the present invention is not restricted thereto, and the control of delivering the exhaust gas, retained at the intake side relative to the exhaust port, to the exhaust pipe side does not have to be performed when the engine is started. Also, the control of delivering the exhaust gas, retained at the intake side relative to the exhaust port, to the exhaust pipe side may be performed when the engine is started in each of the second and third preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-086430 filed in the Japan Patent Office on Mar. 31, 2009, and the entire disclosure of the application is incorporated herein by reference.

What is claimed is:

1. A water jet propulsion watercraft comprising:
a hull;
an engine attached to the hull, the engine including:
a combustion chamber arranged to combust fuel therein;
an exhaust port arranged to discharge exhaust gas after combustion of the fuel in the combustion chamber;
an exhaust valve arranged to open and close the exhaust port;
an intake port arranged to pass air and the fuel into the combustion chamber; and
an intake valve arranged to open and close the intake port;
a jet propulsion device arranged to be driven by the engine and to draw in water from around the hull and then jet the water;
an exhaust channel connected to the exhaust port and arranged to discharge the exhaust gas from the exhaust port; and
an engine control unit arranged to control the engine such that at least one location in a path leading from the exhaust channel directly to the exhaust port, from the exhaust port directly to the combustion chamber, and from the combustion chamber directly through the intake port is blocked when the engine is stopped.

2. The water jet propulsion watercraft according to claim 1, wherein:
the engine control unit is arranged to stop at least one of the exhaust valve or the intake valve at a position at which at least one of the exhaust port or the intake port is closed when the engine is stopped.

3. The water jet propulsion watercraft according to claim 2, wherein the engine control unit is arranged to stop the exhaust valve at a position of closing the exhaust port when the engine is stopped.

4. A water jet propulsion watercraft comprising:
a hull;
an engine attached to the hull, the engine including:
a combustion chamber arranged to combust fuel therein;
an exhaust port arranged to discharge exhaust gas after combustion of the fuel in the combustion chamber;
an exhaust valve arranged to open and close the exhaust port;
an intake port arranged to pass air and the fuel into the combustion chamber; and
an intake valve arranged to open and close the intake port;
a jet propulsion device arranged to be driven by the engine and to draw in water from around the hull and then jet the water;
an exhaust channel connected to the exhaust port and arranged to discharge the exhaust gas from the exhaust port;
an engine control unit arranged to control the engine such that at least one location in a path leading from the exhaust channel to the intake port is blocked when the engine is stopped; and
a detection unit arranged to detect whether or not the exhaust valve closes the exhaust port and whether or not the intake valve closes the intake port, wherein the engine control unit is arranged to control the engine to move at least one of the exhaust valve or the intake valve to close at least one of the exhaust port or the intake port when the detection unit detects that both the exhaust valve and the intake valve are stopped at respective positions of opening the exhaust port and the intake port when the engine is stopped.

5. The water jet propulsion watercraft according to claim 4, wherein the engine further includes a crankshaft arranged to be rotated by the engine and to serve as a drive source that respectively moves the exhaust valve and the intake valve, and a starter motor arranged to cause the crankshaft to rotate during starting, wherein the engine control unit is arranged to control the starter motor until at least one of either the exhaust valve or the intake valve is moved to the position of closing the exhaust port or the intake port when the detection unit detects that both the exhaust valve and the intake valve are stopped at respective positions of opening the exhaust port and the intake port when the engine is stopped.

6. The water jet propulsion watercraft according to claim 5, wherein the engine control unit is arranged to drive the starter motor again when the detection unit detects that both the exhaust valve and the intake valve are still stopped at respective positions of opening the exhaust port and the intake port after the starter motor has been driven by a predetermined drive amount.

7. The water jet propulsion watercraft according to claim 4, wherein the engine further includes a first cam portion arranged to move the exhaust valve and the intake valve at predetermined timings, and the engine control unit is arranged to control a rotation timing of the first cam portion to change the rotation timing of the first cam portion between a time when the engine is driven and a time when the engine is stopped to thereby change the timing of moving at least one of the exhaust valve and the intake valve such that an overlap period, in which the exhaust port and the intake port are opened simultaneously, occurs when the engine is driven and such that the overlap period does not occur when the engine is stopped.

8. The water jet propulsion watercraft according to claim 4, wherein the engine is arranged to move the exhaust valve and the intake valve, respectively, when opening and closing the exhaust port and the intake port, the engine further includes a second cam portion arranged to be movable with respect to at least one of the exhaust valve or the intake valve, and the engine control unit is arranged to control a position of the second cam portion to change the position of the second cam portion between when the engine is driven and when the engine is stopped to thereby change a displacement amount of at least one of the exhaust valve and the intake valve such that an overlap period, in which the exhaust port and the intake port are opened simultaneously, occurs when the engine is driven and such that the overlap period does not occur when the engine is stopped.

9. The water jet propulsion watercraft according to claim 4, wherein the engine control unit is arranged to continue the control operation, after the engine is stopped, until the detection unit detects that at least one of the exhaust valve or the intake valve is stopped at a position of closing the exhaust port or the intake port.

10. A water jet propulsion watercraft comprising:
a hull;
an engine attached to the hull, the engine including:
    a combustion chamber arranged to combust fuel therein;
    an exhaust port arranged to discharge exhaust gas after combustion of the fuel in the combustion chamber;
    an exhaust valve arranged to open and close the exhaust port;
    an intake port arranged to pass air and the fuel into the combustion chamber; and
    an intake valve arranged to open and close the intake port;
a jet propulsion device arranged to be driven by the engine and to draw in water from around the hull and then jet the water;
an exhaust channel connected to the exhaust port and arranged to discharge the exhaust gas from the exhaust port;
an engine control unit arranged to control the engine such that at least one location in a path leading from the exhaust channel to the intake port is blocked when the engine is stopped; and
a fuel injection apparatus arranged to inject fuel into the intake port, wherein, when starting of the engine is performed, the engine control unit is arranged to deliver the exhaust gas that is retained at the intake side relative to the exhaust port to the exhaust channel side in a state where a fuel injection amount of the fuel injection apparatus is set lower than an ordinary injection amount for a predetermined period and to set the injection amount of the fuel injection apparatus to the ordinary injection amount after elapse of the predetermined period.

11. The water jet propulsion watercraft according to claim 1, wherein the engine includes a plurality of cylinders, each cylinder includes the exhaust valve and the intake valve, the exhaust valve and the intake valve of each cylinder has an overlap period in which both valves are in an open state, and the overlap periods in the plurality of cylinders do not overlap.

12. A water jet propulsion watercraft comprising:
a hull;
an engine attached to the hull, the engine including:
    a combustion chamber arranged to combust fuel therein;
    an exhaust port arranged to discharge exhaust gas after combustion of the fuel in the combustion chamber;
    an exhaust valve arranged to open and close the exhaust port;
    an intake port arranged to pass air and the fuel into the combustion chamber; and
    an intake valve arranged to open and close the intake port;
a jet propulsion device arranged to be driven by the engine and to draw in water from around the hull and then jet the water;
an exhaust channel connected to the exhaust port and arranged to discharge the exhaust gas from the exhaust port; and
an engine control unit arranged to control the engine such that the exhaust channel does not communicate with the intake port when the engine is stopped to prevent the exhaust gas from flowing from the exhaust channel directly to the combustion chamber and from the combustion chamber directly through the intake port.

* * * * *